United States Patent [19]

Gannaway

[11] Patent Number: 4,776,956

[45] Date of Patent: Oct. 11, 1988

[54] COMBINATION WATER FILTER AND CONTAINER APPARATUS

[76] Inventor: Richard M. Gannaway, 1845 S. Highland, Bldg. 11, Apt. 13, Clearwater, Fla. 33516

[21] Appl. No.: 173,059

[22] Filed: Mar. 24, 1988

[51] Int. Cl.⁴ .......................................... B01D 27/02
[52] U.S. Cl. ................................................ 210/282
[58] Field of Search ............... 210/238, 282, 465, 469, 210/470

[56] References Cited

U.S. PATENT DOCUMENTS

| 1,774,004 | 8/1930 | Haslett | 210/282 |
| 1,834,045 | 12/1931 | Breuil | 210/282 |
| 3,392,837 | 7/1968 | Sanzenbacher | 210/282 |

Primary Examiner—Ivars Cintins
Attorney, Agent, or Firm—Herbert W. Larson

[57] ABSTRACT

A combination of a cylindrical water filter attached to a water container in the form of a handle. Pressurized water is fed through a first end of the filter through a filtering media. The filtered water exits the filter through an L-shaped channel directly into the attached container.

11 Claims, 3 Drawing Sheets

COMBINATION WATER FILTER AND CONTAINER APPARATUS

BACKGROUND OF THE INVENTION

1. Prior Applications

This invention is related to my applications Ser. No. 931,091 filed Nov. 17, 1986 and Ser. No. 109,897 filed Oct. 19, 1987.

2. Field of the Invention

This invention relates to water filter devices. More particularly, it refers to a water filter attached to a container to provide direct filtering of water while filling the container.

3. Description of the Prior Art

Page 73 of the February 1983 issue of Consumer Report described the Norelco Clean Water machine which consists of a pump unit forcing water through a filter and then into a pitcher for immediate use. Other devices of this type are the Ecologizer mentioned in the Consumer Report's article along with the Pocket Purifier which is an eight inch long plastic tuber containing a five stage filter for use during camping expeditions. Although these prior art devices are useful in filtering tap water or other water sources they involve the use of pumps and the requirement of an electrical system in the case of Norelco Clean Water machine. With respect to the Pocket Purifier there are no connection devices for flowing water under pressure through the filter device directly to a receptacle. A device is needed that will easily attach to a water receptacle so that water going into that receptacle is continuously filtered, relying merely on the pressure of the water source to push the water through the filter media and into the container.

SUMMARY OF THE INVENTION

I have invented a combination water filter and water container apparatus that is completely self contained and provides for filtering of water from a water source such as a hose, sink spray device or other sind fixture merely by connecting to one end of a cylindrical filter which is mounted on a side wall of a container and provides for direct filling of a container with filtered water.

My device has a filtering device constituting a hollow cylindrical tube enclosing a water filtering media. The tube has a first and second open end. The first end has a fixture for attaching a hose, a sink spray or sink fixture. The second end has an exit channel leading directly into an attached container. The filtering device is slidably enclosed within a pair of brackets permanently attached to a side wall or a lid of the water container. The cylindrical filtering tube also acts as a handle for the container. The water flows through the filtering media aided by the pressure of the water source. The filtered water passes directly into the container through an L-shaped channel at the bottom of the cylindrial tube. In this manner, up to 250 gallons or purified water can be flowed into the container for eventual dispensing as needed by the owner.

BRIEF DESCRIPTION OF THE DRAWINGS

The present invention may be best understood by those having ordinary skill in the art by reference to the following detailed description when considered in conjunction with the accompanying drawings in which.

DETAILED DESCRIPTION OF THE INVENTION

Figure 1:
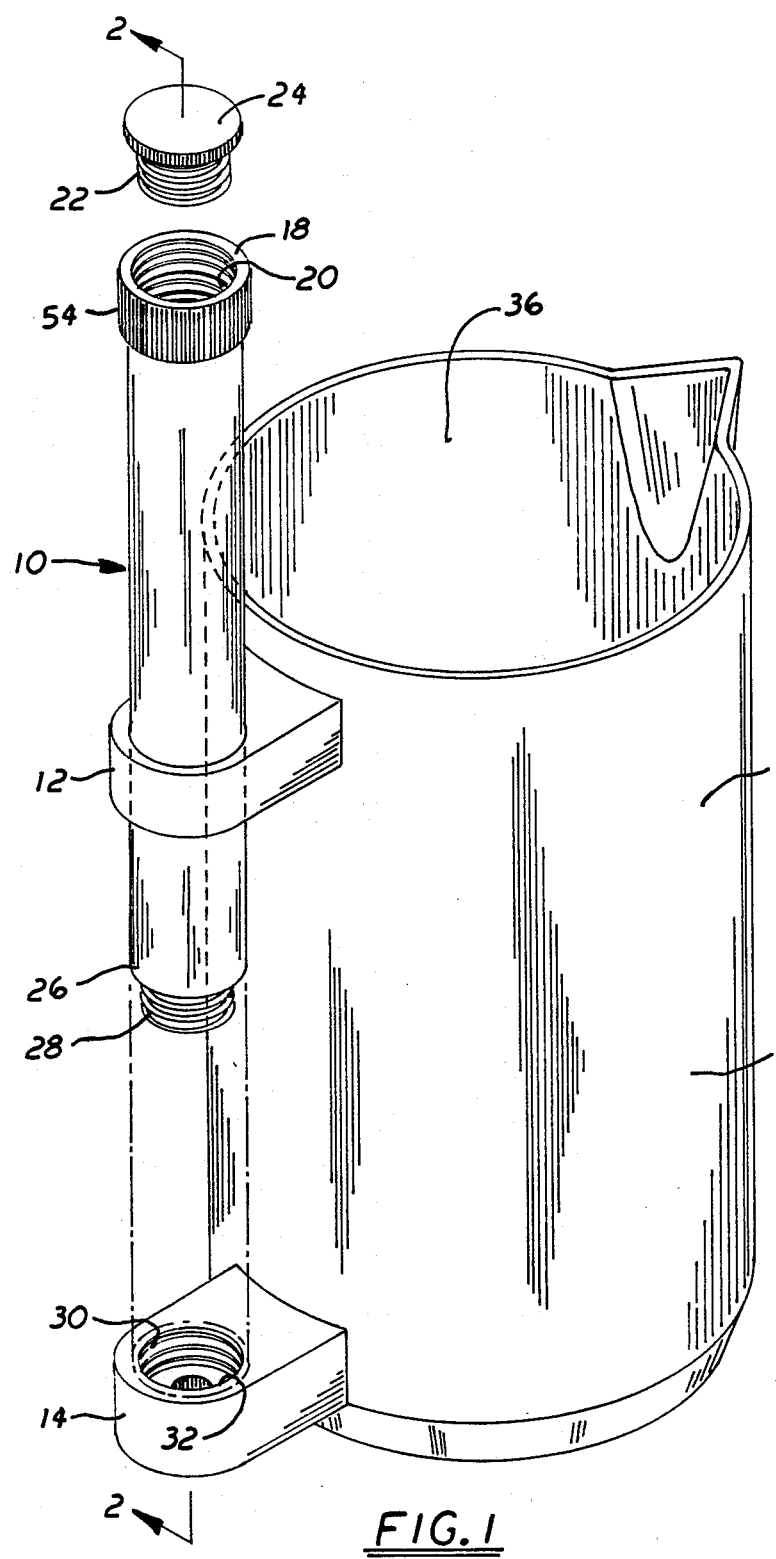
FIG. 1 is a perspective view partially exploded of the invention.

Throughout the following detailed description the same reference numerals refer to the same elements in all figures.

The apparatus of this invention combines a water filter 10 slidably mounted on a pair of brackets 12 and 14 to a water receptacle 16.

A first end 18 of the cylindrical filter 10 has a threaded 20 interior wall segment which engages screw threads 22 on a cap 24 to close the first end 18 of the filter 10. The second end 26 of the filter cylinder 10 is threaded 28 on an exterior wall and engages interior threads 30 on interior wall 32 of bracket 14.

Figure 2:
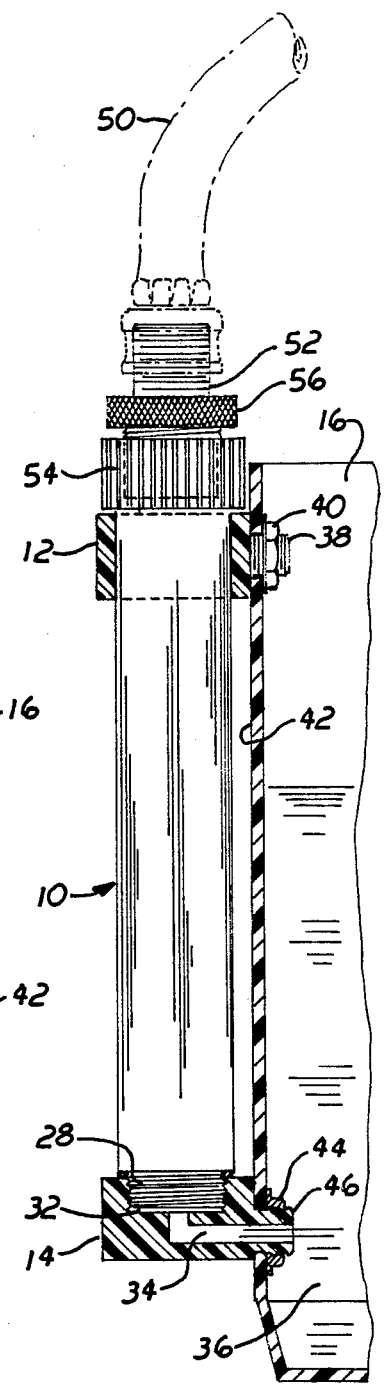
FIG. 2 is a sectional view in elevation of the filter apparatus attached to a container along line 2—2 of FIG. 1.

A channel 34 seen in FIG. 2 is L-shaped and leads from the second end 26 of tube 10 directly into the interior 36 of container 16. Bracket 12 is held in place on the interior wall 42 of the container by bolt 38 together with a washer and nut 40. In like manner bracket 14 is mounted on the interior wall 42 of container 16 using a nut 44 and threaded bolt 46 which has a channel going through it as an extension of channel 34.

Figure 3:
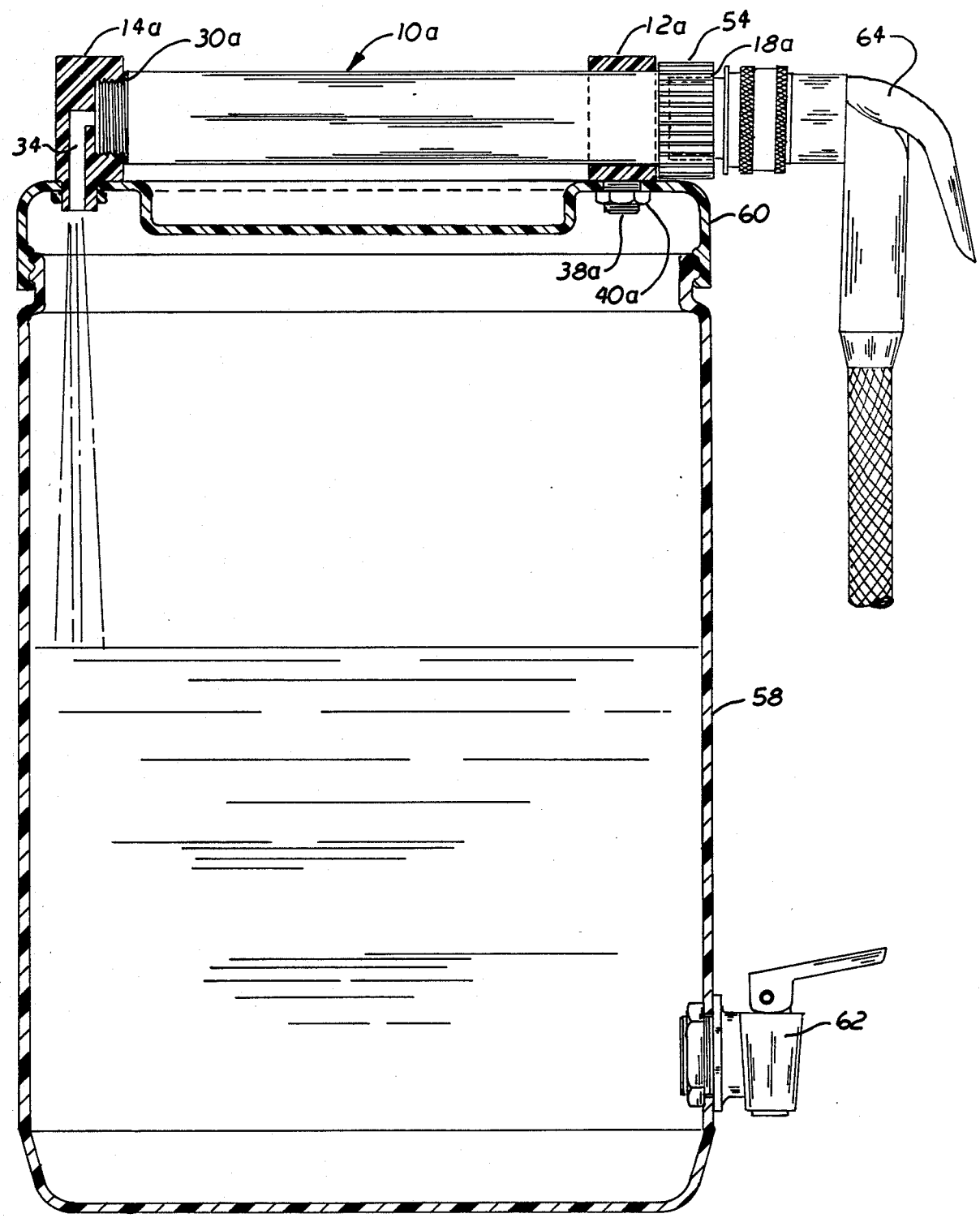
FIG. 3 is a sectional view in elevation of the filter apparatus located on the cover of a water container.

The container 16 can be of any size and shape such as shown in FIG. 1 and FIG. 3. It can be a cylindrical member or a rectangular member or square or any other conceivable shape used to contain water.

FIG. 2 shows a hose 50 in phantom connecting to a joining element 52 which in turn connects to the threads 20 in the opening at a first end 18 of the filter member 10. A collar 54 surrounds the first end of the filter element. The ring 56 on joining element 52 cannot be screwed beyond the top of collar 54.

Figure 4:
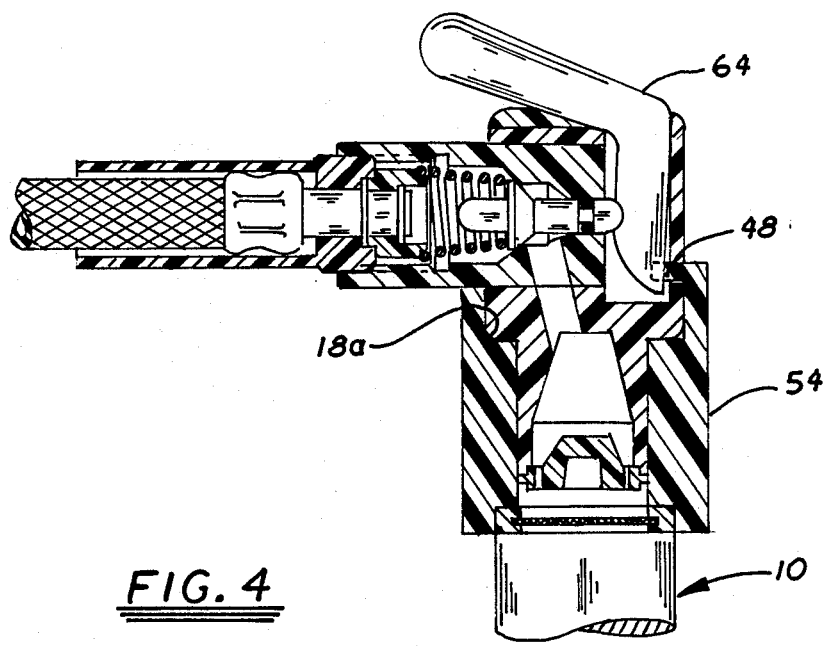
FIG. 4 is a section view of an alternate connection device at a first end of the filter.
Figure 5:
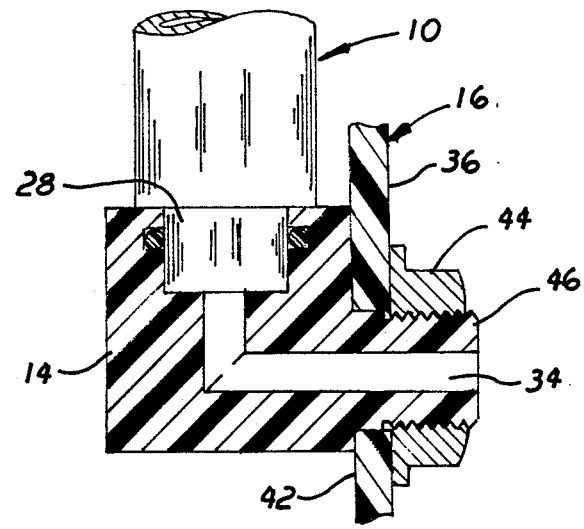
FIG. 5 is a section view of an alternate connection at the second end of the filter.

In an alternative embodiment as seen in FIG. 4 there is a tab 48 located in opening 18a to permit a sink spray or like device to be inserted into the opening. Tab 48 activates a slot in the sink spray which causes water to flow through a valve in the sink spray directly to the cylindrical filter member.

As shown in FIG. 3 the water container can be a large rectangular structure 58 having a top 60. The filter element 10a is attached to it by brackets 12a and 14a. The same channel 34 leads into the top cover 60 of container 58 and allows filtered water to fall directly into the container. This particular container has a spigot 62 from which water can be drained. A sink spray 64 is shown connected to the first end collar 54 of filter 10. Brackets 12a and 14a connect the filter 10a to the lid 60 of container 58. Bolt 38a and nut 40a connect the bracket 12a to the lid 60. Bracket 14a is held in place in like manner. Bracket 12a slidably holds filter 10a and bracket 14a engages to threads 30a on filter 10a.

Generally the filter housing 10 or 10a as well as brackets 12, 12a, 14 or 14a and the container 16 or 58 are all made from a high impact polyethylene or other plastic material. The material used within tube 10 to filter water is activated charcoal, coral sand or ion exchange resin.

The combination apparatus of this invention permits a total of about 250 gallons of water through the filter element 10 or 10a prior to exhausting the supply of filtering media. Although the filter element 10 or 10a can be replaced when the filter media is exhausted it might also be possible to throw away the entire unit and replace it. This device provides a means to continuously feed filtered water into the container without the necessity of electric gadgets or other outside devices. In addition the filtering tube 10 or 10a acts as a handle to facilitate carrying or moving the container about.

Equivalent materials may be substituted for those set forth herein in order to achieve the same apparatus described herein.

Having thus described the invention, what is claimed and desired to be secured by Letters Patent is:

1. A combination water filter and water container apparatus comprising:
   (a) a hollow cylindrical tube enclosing a water filtering media, the tube having a first and a second open end;
   (b) the first open end of the tube having a means for attaching a fixture joined to a downstream end of a pressurized water source;
   (c) the second end of the tube having an exit channel leading to an interior portion of the container;
   (d) a pair of brackets fastening the tube to a wall of the container; and
   (e) the container having a means for directing a flow of filtered water outside the container.

2. A combination apparatus according to claim 1 wherein the filtering media is activated charcoal.

3. A combination apparatus according to claim 2 wherein the filtering media is coral sand.

4. A combination apparatus according to claim 1 wherein the filtering media is an ion exchange resin.

5. A combination apparatus according to claim 1 wherein the first open end of the tube contains threads on an interior wall by which it is threaded to another member on a water source.

6. A combination apparatus according to claim 1 wherein the first end of the tube forms an annular opening and has a locking tab integral with an interior wall, the tab projecting from the wall towards a center of the annular opening.

7. A combination apparatus according to claim 1 wherein the exit channel at the second end of the tube is L-shaped.

8. A combination apparatus according to claim 1 wherein a first bracket permanently attached to the container slidably retains the cylindrical tube and the second bracket permanently attached to the container contains internal threads to engage threads at a second end of the tube.

9. A combination apparatus according to claim 8 wherein each bracket penetrates a side wall of the container and is permanently mounted by an attaching device on an interior surface wall of the container.

10. A combination apparatus according to claim 8 wherein each bracket penetrates a lid of the container and is permanently mounted by an attaching device on an interior surface of the lid.

11. A combination apparatus according to claim 1 wherein the brackets slidably retain the cylindrical tube and the brackets are permanently mounted on a side wall or lid of the container.

* * * * *